United States Patent
Hong

(10) Patent No.: US 11,710,036 B2
(45) Date of Patent: Jul. 25, 2023

(54) ARTIFICIAL INTELLIGENCE SERVER

(71) Applicant: LG ELECTRONICS INC., Seoul (KR)

(72) Inventor: Chungpyo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 739 days.

(21) Appl. No.: 16/743,230

(22) Filed: Jan. 15, 2020

(65) Prior Publication Data

US 2021/0133562 A1 May 6, 2021

(30) Foreign Application Priority Data

Nov. 1, 2019 (KR) .................. 10-2019-0138821

(51) Int. Cl.
*G06N 3/08* (2023.01)
*G06N 3/04* (2023.01)
*G06N 3/045* (2023.01)
*G06N 3/084* (2023.01)
*G06F 16/906* (2019.01)

(52) U.S. Cl.
CPC .............. *G06N 3/08* (2013.01); *G06N 3/04* (2013.01); *G06F 16/906* (2019.01); *G06N 3/045* (2023.01); *G06N 3/084* (2013.01)

(58) Field of Classification Search
CPC ............ G06N 3/08; G06N 3/04; G06N 3/084; G06N 3/0454; G06F 16/906
See application file for complete search history.

(56) References Cited

U.S. PATENT DOCUMENTS

| | | | | |
|---|---|---|---|---|
| 10,426,442 | B1* | 10/2019 | Schnorr | A61B 8/5223 |
| 10,552,735 | B1* | 2/2020 | Widerhorn | G06N 5/01 |
| 11,513,245 | B2* | 11/2022 | Xue | G01V 1/008 |
| 2018/0268244 | A1* | 9/2018 | Moazzami | G06V 10/82 |
| 2019/0095753 | A1* | 3/2019 | Wolf | G06V 30/40 |
| 2019/0130110 | A1* | 5/2019 | Lee | G06F 21/57 |
| 2019/0188562 | A1* | 6/2019 | Edwards | G06N 3/04 |
| 2020/0143238 | A1* | 5/2020 | Ramnath | G06F 16/5838 |
| 2020/0143242 | A1* | 5/2020 | Lafontaine | G06N 3/0454 |
| 2020/0226212 | A1* | 7/2020 | Tan | G06V 30/1988 |
| 2020/0394509 | A1* | 12/2020 | Thomas | G06F 40/284 |
| 2021/0019605 | A1* | 1/2021 | Rouhani | G06V 10/82 |
| 2021/0133562 | A1* | 5/2021 | Hong | G06N 3/045 |

* cited by examiner

*Primary Examiner* — YuJang Tswei
(74) *Attorney, Agent, or Firm* — Birch, Stewart, Kolasch & Birch, LLP

(57) ABSTRACT

An artificial intelligence (AI) server is provided. The AI server includes a communication interface configured to communicate with an electronic device, and at least one processor configured to update a classification layer by training an artificial intelligence model in such a manner that classification training data and classification labeling data are provided to the artificial intelligence model including a feature extraction layer for extracting a feature vector and a classification layer for classifying input data using the feature vector, and transmit the updated classification layer to the electronic device.

15 Claims, 11 Drawing Sheets

FIG. 6
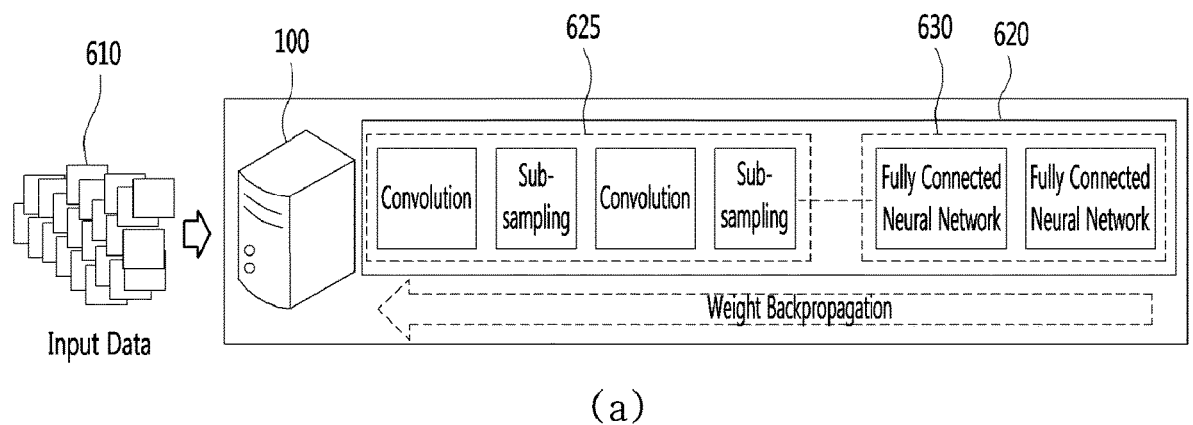
(a)
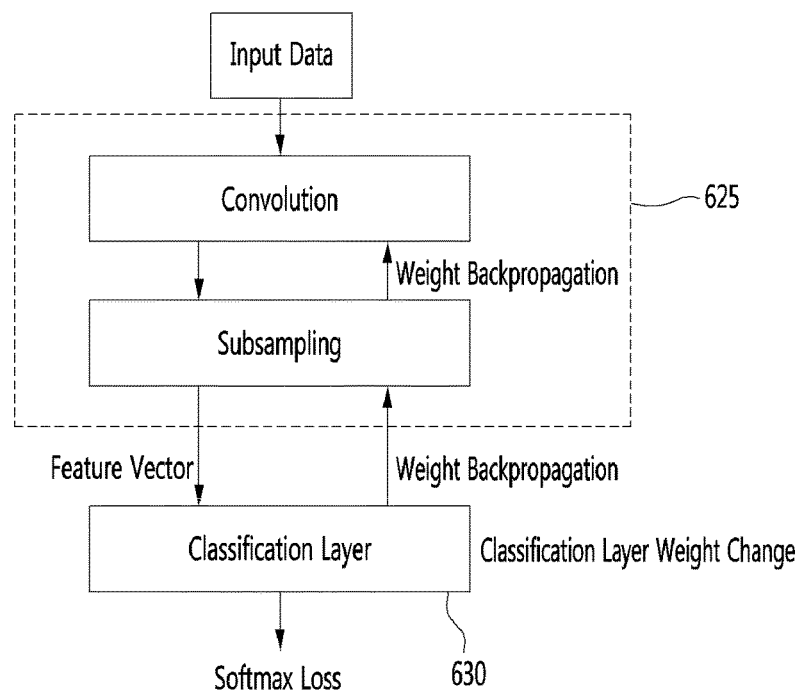
(b)

FIG. 8
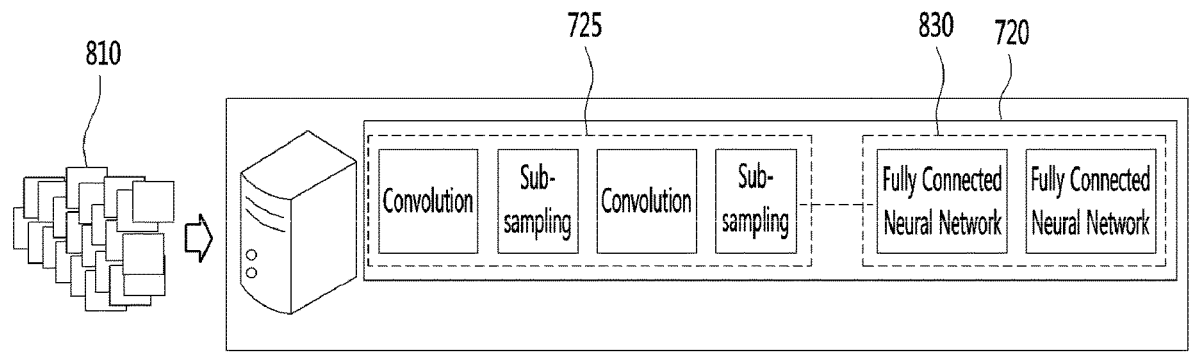
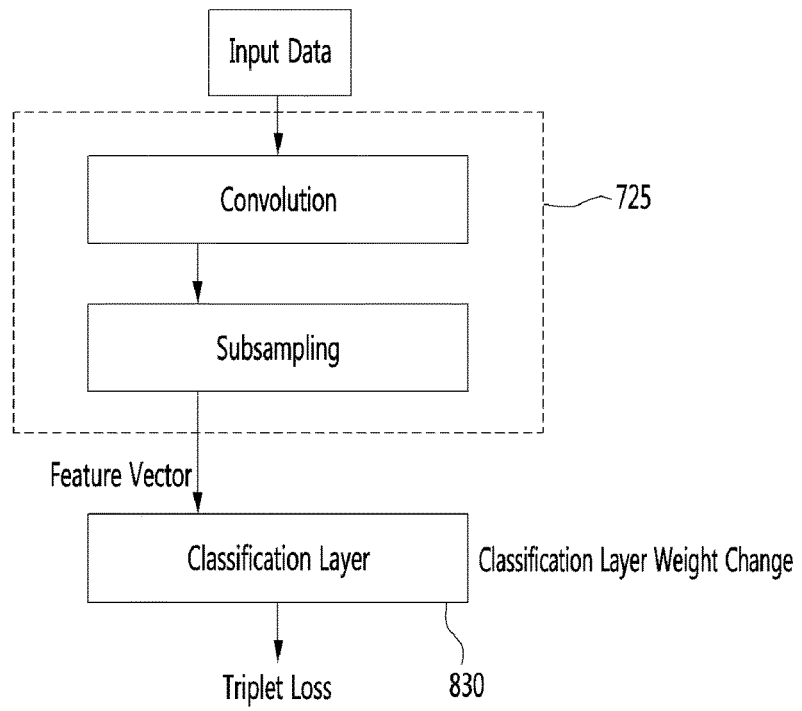

ARTIFICIAL INTELLIGENCE SERVER

CROSS-REFERENCE TO RELATED APPLICATIONS

This application claims priority to Korean Patent Application No. 10-2019-0138821 filed in the Republic of Korea on Nov. 1, 2019, the entire contents of which are hereby incorporated by reference in its entirety.

BACKGROUND

The present disclosure relates to an artificial intelligence server capable of updating and providing a classification layer among a feature extraction layer and the classification layer constituting an artificial intelligence model.

Artificial intelligence (AI) is one field of computer engineering and information technology for studying a method of enabling a computer to perform thinking, learning, and self-development that can be performed by human intelligence and may denote that a computer imitates an intelligent action of a human.

Also, AI is directly or indirectly associated with the other field of computer engineering without being individually provided. Particularly, at present, in various fields of information technology, an attempt to introduce AI components and use the AI components in solving a problem of a corresponding field is being actively done.

Meanwhile, techniques for perceiving and learning the surrounding situation by using AI and providing information desired by the user in a desired form, or performing an operation or function desired by the user are being actively studied.

An electronic device that provides such various operations and functions may be referred to as an AI device.

A model learned through machine learning cannot depart from the learning range during inference.

For example, in the case of face recognition, when training is performed using white-oriented training data, it is obvious that the inference accuracy of Asians is inevitably deteriorated due to the difference with the training data.

If the entire AI model is retrained with Asian-oriented training data so as to ensure the inference accuracy for Asians, the same costs as when previously trained occur again.

Also, a general-purpose model training for whites and Asians may not be able to perform performance that meets user requirements. For example, if a user only uses an AI model to classify whites, a white-optimized model may exhibit better performance than a general-purpose model.

SUMMARY

The present disclosure has been made in an effort to solve the above-described problems and provides an AI server capable of updating and providing a classification layer among a feature extraction layer and the classification layer constituting an AI model.

In one embodiment, an AI server includes a communication interface configured to communicate with an electronic device, and at least one processor configured to update a classification layer by training an artificial intelligence model in such a manner that classification training data and classification labeling data are provided to the artificial intelligence model including a feature extraction layer for extracting a feature vector and a classification layer for classifying input data using the feature vector, and transmit the updated classification layer to the electronic device.

The details of one or more embodiments are set forth in the accompanying drawings and the description below. Other features will be apparent from the description and drawings, and from the claims.

BRIEF DESCRIPTION OF THE DRAWINGS

FIG. 6 is a view for describing a method of generating an AI model by training a CNN.

FIG. 8 is a view for describing a method of updating a classification layer.

DETAILED DESCRIPTION OF THE EMBODIMENTS

Figure 1:
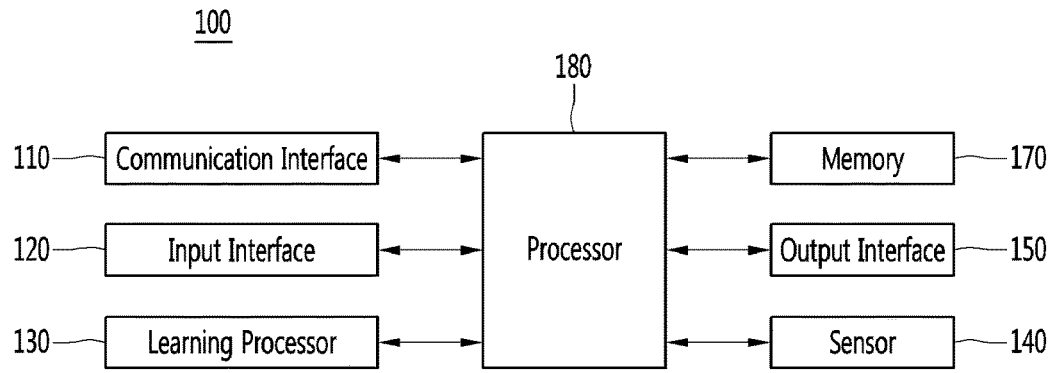
FIG. 1 illustrates an AI device 100 according to an embodiment of the present disclosure.

Hereinafter, embodiments of the present disclosure are described in more detail with reference to accompanying drawings and regardless of the drawings symbols, same or similar components are assigned with the same reference numerals and thus overlapping descriptions for those are omitted. The suffixes "module" and "unit" for components used in the description below are assigned or mixed in consideration of easiness in writing the specification and do not have distinctive meanings or roles by themselves. In the following description, detailed descriptions of well-known functions or constructions will be omitted since they would obscure the disclosure in unnecessary detail. Additionally, the accompanying drawings are used to help easily understanding embodiments disclosed herein but the technical idea of the present disclosure is not limited thereto. It should be understood that all of variations, equivalents or substitutes contained in the concept and technical scope of the present disclosure are also included.

It will be understood that the terms "first" and "second" are used herein to describe various components but these components should not be limited by these terms. These terms are used only to distinguish one component from other components.

In this disclosure below, when one part (or element, device, etc.) is referred to as being 'connected' to another part (or element, device, etc.), it should be understood that the former can be 'directly connected' to the latter, or 'electrically connected' to the latter via an intervening part (or element, device, etc.). It will be further understood that when one component is referred to as being 'directly connected' or 'directly linked' to another component, it means that no intervening component is present.

<Artificial Intelligence (AI)>

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for training data is given, and the label may mean the correct answer (or result value) that the artificial neural network must infer when the training data is input to the artificial neural network. The unsupervised learning may refer to a method of learning an artificial neural network in a state in which a label for training data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep running is part of machine running. In the following, machine learning is used to mean deep running.

<Robot>

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driver including an actuator or a motor and may perform various physical operations such as moving a robot joint. In addition, a movable robot may include a wheel, a brake, a propeller, and the like in a driver, and may travel on the ground through the driver or fly in the air.

<Self-Driving>

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

<eXtended Reality (XR)>

Extended reality is collectively referred to as virtual reality (VR), augmented reality (AR), and mixed reality (MR). The VR technology provides a real-world object and background only as a CG image, the AR technology provides a virtual CG image on a real object image, and the MR technology is a computer graphic technology that mixes and combines virtual objects into the real world.

The MR technology is similar to the AR technology in that the real object and the virtual object are shown together. However, in the AR technology, the virtual object is used in the form that complements the real object, whereas in the MR technology, the virtual object and the real object are used in an equal manner.

The XR technology may be applied to a head-mount display (HMD), a head-up display (HUD), a mobile phone, a tablet PC, a laptop, a desktop, a TV, a digital signage, and the like. A device to which the XR technology is applied may be referred to as an XR device.

FIG. 1 illustrates an AI device 100 according to an embodiment of the present disclosure.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication interface 110, an input interface 120, a learning processor 130, a sensor 140, an output interface 150, a memory 170, and a processor 180.

The communication interface 110 may transmit and receive data to and from external devices such as other AI devices 100a to 100e and the AI server 200 by using wire/wireless communication technology. For example, the communication interface 110 may transmit and receive sensor information, a user input, a learning model, and a control signal to and from external devices.

The communication technology used by the communication interface 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™, RFID (Radio Frequency Identification), Infrared Data Association (IrDA), ZigBee, NFC (Near Field Communication), and the like.

The input interface 120 may acquire various kinds of data.

At this time, the input interface 120 may include a camera for inputting a video signal, a microphone for receiving an audio signal, and a user input interface for receiving information from a user. The camera or the microphone may be treated as a sensor, and the signal acquired from the camera or the microphone may be referred to as sensing data or sensor information.

The input interface 120 may acquire a training data for model learning and an input data to be used when an output is acquired by using learning model. The input interface 120 may acquire raw input data. In this case, the processor 180 or the learning processor 130 may extract an input feature by preprocessing the input data.

The learning processor 130 may learn a model composed of an artificial neural network by using training data. The learned artificial neural network may be referred to as a learning model. The learning model may be used to an infer result value for new input data rather than training data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensor 140 may acquire at least one of internal information about the AI device 100, ambient environment information about the AI device 100, and user information by using various sensors.

Examples of the sensors included in the sensor 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output interface 150 may generate an output related to a visual sense, an auditory sense, or a haptic sense.

At this time, the output interface 150 may include a display for outputting time information, a speaker for outputting auditory information, and a haptic module for outputting haptic information.

The memory 170 may store data that supports various functions of the AI device 100. For example, the memory 170 may store input data acquired by the input interface 120, training data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI device 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
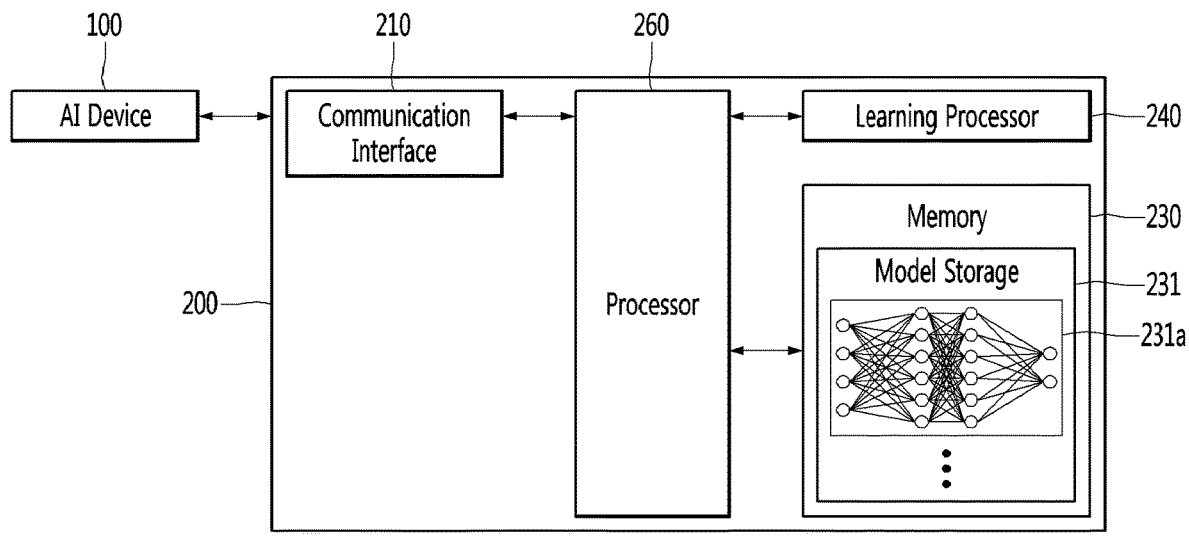
FIG. 2 illustrates an AI server 200 according to an embodiment of the present disclosure.

FIG. 2 illustrates an AI server 200 according to an embodiment of the present disclosure.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication interface 210, a memory 230, a learning processor 240, a processor 260, and the like.

The communication interface 210 can transmit and receive data to and from an external device such as the AI device 100.

The memory 230 may include a model storage 231. The model storage 231 may store a learning or learned model (or an artificial neural network 231a) through the learning processor 240.

The learning processor 240 may learn the artificial neural network 231a by using the training data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
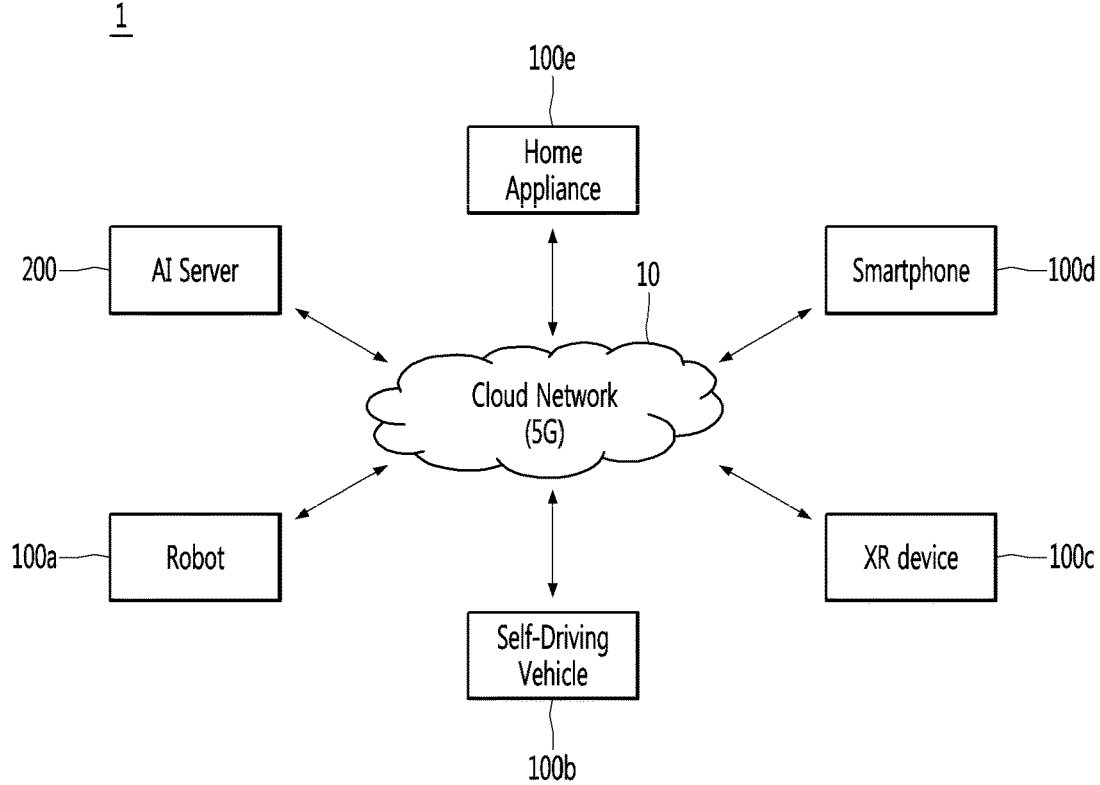
FIG. 3 illustrates an AI system 1 according to an embodiment of the present disclosure.

FIG. 3 illustrates an AI system 1 according to an embodiment of the present disclosure.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

<AI+Robot>

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, and the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driver such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driver based on the control/interaction of the user. At this time, the robot 100a may acquire the intention information of the interaction due to the user's operation or speech utterance, and may determine the response based on the acquired intention information, and may perform the operation.

<AI+Self-Driving>

The self-driving vehicle 100b, to which the AI technology is applied, may be implemented as a mobile robot, a vehicle, an unmanned flying vehicle, or the like.

The self-driving vehicle 100b may include a self-driving control module for controlling a self-driving function, and the self-driving control module may refer to a software module or a chip implementing the software module by hardware. The self-driving control module may be included in the self-driving vehicle 100b as a component thereof, but may be implemented with separate hardware and connected to the outside of the self-driving vehicle 100b.

The self-driving vehicle 100b may acquire state information about the self-driving vehicle 100b by using sensor information acquired from various kinds of sensors, may detect (recognize) surrounding environment and objects, may generate map data, may determine the route and the travel plan, or may determine the operation.

Like the robot 100a, the self-driving vehicle 100b may use the sensor information acquired from at least one sensor among the lidar, the radar, and the camera so as to determine the travel route and the travel plan.

In particular, the self-driving vehicle 100*b* may recognize the environment or objects for an area covered by a field of view or an area over a certain distance by receiving the sensor information from external devices, or may receive directly recognized information from the external devices.

The self-driving vehicle 100*b* may perform the above-described operations by using the learning model composed of at least one artificial neural network. For example, the self-driving vehicle 100*b* may recognize the surrounding environment and the objects by using the learning model, and may determine the traveling movement line by using the recognized surrounding information or object information. The learning model may be learned directly from the self-driving vehicle 100*a* or may be learned from an external device such as the AI server 200.

At this time, the self-driving vehicle 100*b* may perform the operation by generating the result by directly using the learning model, but the sensor information may be transmitted to the external device such as the AI server 200 and the generated result may be received to perform the operation.

The self-driving vehicle 100*b* may use at least one of the map data, the object information detected from the sensor information, or the object information acquired from the external apparatus to determine the travel route and the travel plan, and may control the driver such that the self-driving vehicle 100*b* travels along the determined travel route and travel plan.

The map data may include object identification information about various objects arranged in the space (for example, road) in which the self-driving vehicle 100*b* travels. For example, the map data may include object identification information about fixed objects such as street lamps, rocks, and buildings and movable objects such as vehicles and pedestrians. The object identification information may include a name, a type, a distance, and a position.

In addition, the self-driving vehicle 100*b* may perform the operation or travel by controlling the driver based on the control/interaction of the user. At this time, the self-driving vehicle 100*b* may acquire the intention information of the interaction due to the user's operation or speech utterance, and may determine the response based on the acquired intention information, and may perform the operation.

<AI+XR>

The XR device 100*c*, to which the AI technology is applied, may be implemented by a head-mount display (HMD), a head-up display (HUD) provided in the vehicle, a television, a mobile phone, a smartphone, a computer, a wearable device, a home appliance, a digital signage, a vehicle, a fixed robot, a mobile robot, or the like.

The XR device 100*c* may analyzes three-dimensional point cloud data or image data acquired from various sensors or the external devices, generate position data and attribute data for the three-dimensional points, acquire information about the surrounding space or the real object, and render to output the XR object to be output. For example, the XR device 100*c* may output an XR object including the additional information about the recognized object in correspondence to the recognized object.

The XR device 100*c* may perform the above-described operations by using the learning model composed of at least one artificial neural network. For example, the XR device 100*c* may recognize the real object from the three-dimensional point cloud data or the image data by using the learning model, and may provide information corresponding to the recognized real object. The learning model may be directly learned from the XR device 100*c*, or may be learned from the external device such as the AI server 200.

At this time, the XR device 100*c* may perform the operation by generating the result by directly using the learning model, but the sensor information may be transmitted to the external device such as the AI server 200 and the generated result may be received to perform the operation.

<AI+Robot+Self-Driving>

The robot 100*a*, to which the AI technology and the self-driving technology are applied, may be implemented as a guide robot, a carrying robot, a cleaning robot, a wearable robot, an entertainment robot, a pet robot, an unmanned flying robot, or the like.

The robot 100*a*, to which the AI technology and the self-driving technology are applied, may refer to the robot itself having the self-driving function or the robot 100*a* interacting with the self-driving vehicle 100*b*.

The robot 100*a* having the self-driving function may collectively refer to a device that moves for itself along the given movement line without the user's control or moves for itself by determining the movement line by itself.

The robot 100*a* and the self-driving vehicle 100*b* having the self-driving function may use a common sensing method so as to determine at least one of the travel route or the travel plan. For example, the robot 100*a* and the self-driving vehicle 100*b* having the self-driving function may determine at least one of the travel route or the travel plan by using the information sensed through the lidar, the radar, and the camera.

The robot 100*a* that interacts with the self-driving vehicle 100*b* exists separately from the self-driving vehicle 100*b* and may perform operations interworking with the self-driving function of the self-driving vehicle 100*b* or interworking with the user who rides on the self-driving vehicle 100*b*.

At this time, the robot 100*a* interacting with the self-driving vehicle 100*b* may control or assist the self-driving function of the self-driving vehicle 100*b* by acquiring sensor information on behalf of the self-driving vehicle 100*b* and providing the sensor information to the self-driving vehicle 100*b*, or by acquiring sensor information, generating environment information or object information, and providing the information to the self-driving vehicle 100*b*.

Alternatively, the robot 100*a* interacting with the self-driving vehicle 100*b* may monitor the user boarding the self-driving vehicle 100*b*, or may control the function of the self-driving vehicle 100*b* through the interaction with the user. For example, when it is determined that the driver is in a drowsy state, the robot 100*a* may activate the self-driving function of the self-driving vehicle 100*b* or assist the control of the driver of the self-driving vehicle 100*b*. The function of the self-driving vehicle 100*b* controlled by the robot 100*a* may include not only the self-driving function but also the function provided by the navigation system or the audio system provided in the self-driving vehicle 100*b*.

Alternatively, the robot 100*a* that interacts with the self-driving vehicle 100*b* may provide information or assist the function to the self-driving vehicle 100*b* outside the self-driving vehicle 100*b*. For example, the robot 100*a* may provide traffic information including signal information and the like, such as a smart signal, to the self-driving vehicle 100*b*, and automatically connect an electric charger to a charging port by interacting with the self-driving vehicle 100b like an automatic electric charger of an electric vehicle.

<AI+Robot+XR>

The robot 100a, to which the AI technology and the XR technology are applied, may be implemented as a guide robot, a carrying robot, a cleaning robot, a wearable robot, an entertainment robot, a pet robot, an unmanned flying robot, a drone, or the like.

The robot 100a, to which the XR technology is applied, may refer to a robot that is subjected to control/interaction in an XR image. In this case, the robot 100a may be separated from the XR device 100c and interwork with each other.

When the robot 100a, which is subjected to control/interaction in the XR image, may acquire the sensor information from the sensors including the camera, the robot 100a or the XR device 100c may generate the XR image based on the sensor information, and the XR device 100c may output the generated XR image. The robot 100a may operate based on the control signal input through the XR device 100c or the user's interaction.

For example, the user can confirm the XR image corresponding to the time point of the robot 100a interworking remotely through the external device such as the XR device 100c, adjust the self-driving travel path of the robot 100a through interaction, control the operation or driving, or confirm the information about the surrounding object.

<AI+Self-Driving+XR>

The self-driving vehicle 100b, to which the AI technology and the XR technology are applied, may be implemented as a mobile robot, a vehicle, an unmanned flying vehicle, or the like.

The self-driving driving vehicle 100b, to which the XR technology is applied, may refer to a self-driving vehicle having a means for providing an XR image or a self-driving vehicle that is subjected to control/interaction in an XR image. Particularly, the self-driving vehicle 100b that is subjected to control/interaction in the XR image may be distinguished from the XR device 100c and interwork with each other.

The self-driving vehicle 100b having the means for providing the XR image may acquire the sensor information from the sensors including the camera and output the generated XR image based on the acquired sensor information. For example, the self-driving vehicle 100b may include an HUD to output an XR image, thereby providing a passenger with a real object or an XR object corresponding to an object in the screen.

At this time, when the XR object is output to the HUD, at least part of the XR object may be outputted so as to overlap the actual object to which the passenger's gaze is directed. Meanwhile, when the XR object is output to the display provided in the self-driving vehicle 100b, at least part of the XR object may be output so as to overlap the object in the screen. For example, the self-driving vehicle 100b may output XR objects corresponding to objects such as a lane, another vehicle, a traffic light, a traffic sign, a two-wheeled vehicle, a pedestrian, a building, and the like.

When the self-driving vehicle 100b, which is subjected to control/interaction in the XR image, may acquire the sensor information from the sensors including the camera, the self-driving vehicle 100b or the XR device 100c may generate the XR image based on the sensor information, and the XR device 100c may output the generated XR image. The self-driving vehicle 100b may operate based on the control signal input through the external device such as the XR device 100c or the user's interaction.

Meanwhile, the term "AI device 100" may be used interchangeably with the term "AI server 100."

Figure 4:
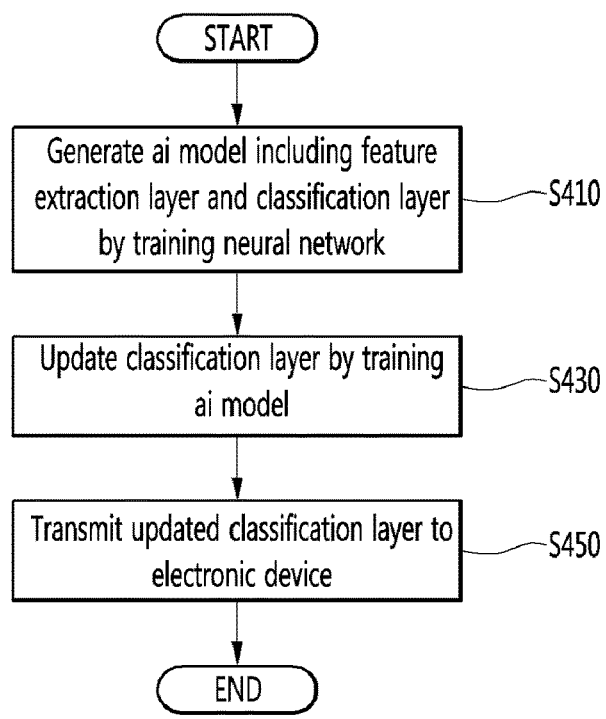
FIG. 4 is a view for describing an operating method of an AI server.

FIG. 4 is a view for describing an operating method of an AI server.

Referring to FIG. 4, the operating method of the AI server may include: generating an AI model by training a neural network using training data for AI training and labeling data for AI training (S410); updating a classification layer by training the AI model (S430); and transmitting the updated classification layer to an electronic device (S450).

Hereinafter, a neural network will be described as an example of a convolutional neural network (CNN). However, the present disclosure is not limited thereto, and the neural network may include various networks such as a deep neural network (DNN), a recurrent neural network (RNN), a bidirectional recurrent deep neural network (BRDNN), and a multilayer perceptron (MLP).

Figure 5:
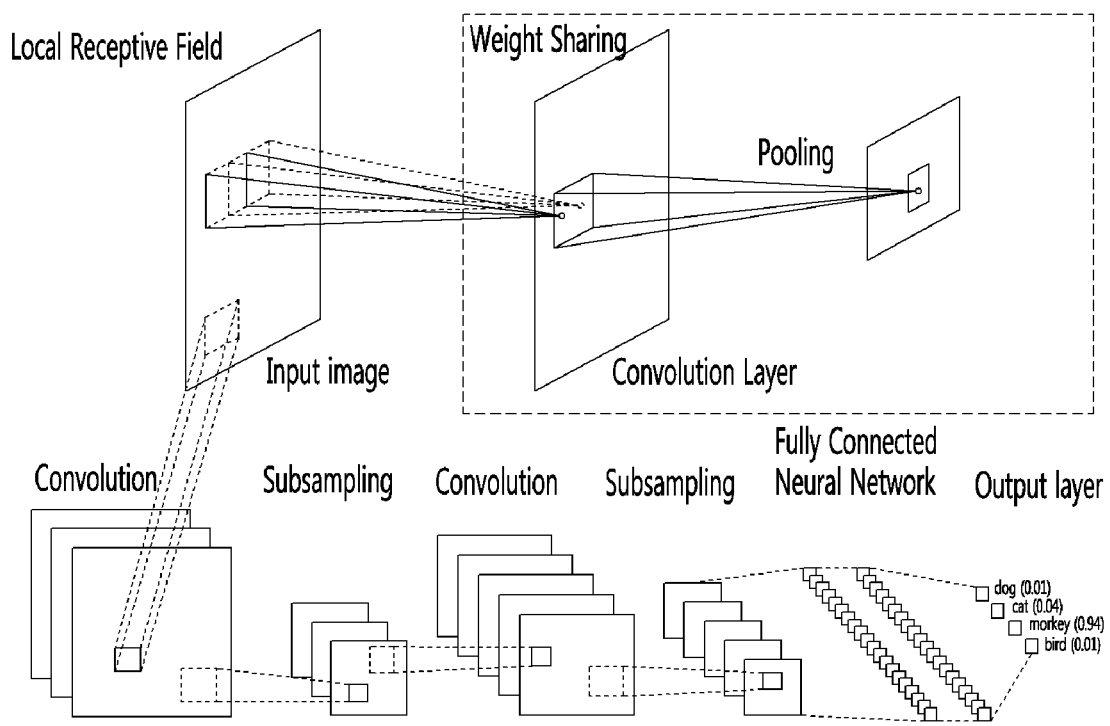
FIG. 5 is a view for describing a convolutional neural network (CNN) among neural networks.

FIG. 5 is a view for describing the CNN among the neural networks.

A general type of CNN is illustrated in FIG. 5.

The CNN is a type of DNN and may include an input layer, one or more convolutional layers, one or more pooling layers, one or more fully connected layers, and an output layer. The pooling layer may also be referred to as subsampling.

Since the CNN has a structure suitable for learning 2D data, the CNN may be widely used in various applications, such as object classification and object detection in images.

The CNN may include a feature extraction layer for extracting a feature vector and a classification layer for classifying input data using the extracted feature vector.

The feature extraction layer may include one or more convolutional layers and one or more pooling layers.

Meanwhile, the feature extraction layer may include a plurality of convolutional layers and a plurality of consolidation layers. In this case, the convolutional layers and the consolidation layers may be alternately arranged.

The feature extraction layer may receive input data, extract a feature vector from the received input data, and output the extracted feature vector.

Specifically, the feature extraction layer may extract the feature vector from the input data using convolution layers and pooling layers alternately arranged, activation functions such as rectified linear unit (ReLU), and predetermined parameters (at least one of weight or bias).

Meanwhile, the classification layer may include one or more fully connected layers. In some cases, the classification layer may further include an output layer.

The classification layer may receive the feature vector and classify the input data using the received feature vector.

In detail, the classification layer may classify the input data into any one of a plurality of classes using one or more fully connected layers and predetermined parameters (at least one of weight or bias).

Meanwhile, the following description will be given with reference to the CNN, but the present disclosure is not limited thereto. The present disclosure can be applied to an AI model (or a neural network) including a feature extraction layer for extracting a feature vector and a classification layer for classifying input data using the feature vector.

FIG. 6 is a view for describing a method of generating an AI model by training a CNN.

The processor may train the CNN using general-purpose training data and general-purpose labeling data.

The general-purpose training data may be training data for generating an AI model that is universally applied to input data of various categories. Also, the general-purpose labeling data may be data provided to the CNN as the correct answer value of the general-purpose training data in supervised learning.

For example, if the CNN is trained to generate a face recognition model, general-purpose training data may include face images of whites, blacks, and Asians. Also, the general-purpose labeling data may be white if the general-purpose training data is a white image, black if the general-purpose training data is a black image, and Asian if the general-purpose training data is an Asian image.

Meanwhile, the CNN 620 may receive the general-purpose training data and extract the feature vector of the general-purpose training data according to the parameter set to the feature extraction layer 625. Also, the CNN may output an estimated value according to a parameter set to the classification layer 630. The estimated value may refer to a result obtained when the classification layer classifies the feature vector into any one of a plurality of classes.

In the process of training the neural network, the processor may adjust the parameter (at least one of weight or bias) of the feature extraction layer 625 and the parameter (at least one of the weight or the bias) of the classification layer 630, so that an error between the estimated value of the neural network and the general-purpose labeling data is reduced.

In detail, the processor may change the parameters of the AI model 620 so as to reduce a cost (error between the estimated value of the neural network and the general-purpose labeling data) based on a cost function. As the cost function, a softmax cost function may be used, but the present disclosure is not limited thereto.

Also, the processor may update not only the parameter of the classification layer 630 but also the parameter of the feature extraction layer 625 based on a backpropagation algorithm.

That is, the processor may first update the parameter of the classification layer 630 based on the cost (or error) by propagating the cost (or error) in the reverse direction of the CNN's processing direction, and then update the parameter of the feature extraction layer 625. In this case, a gradient descent algorithm may be used to find a parameter that minimizes the cost (or error).

Meanwhile, if the CNN 620 exhibits an accuracy of a certain level or more through repetitive training using the general-purpose training data and the general-purpose labeling data, the processor may complete the training.

Figure 7:
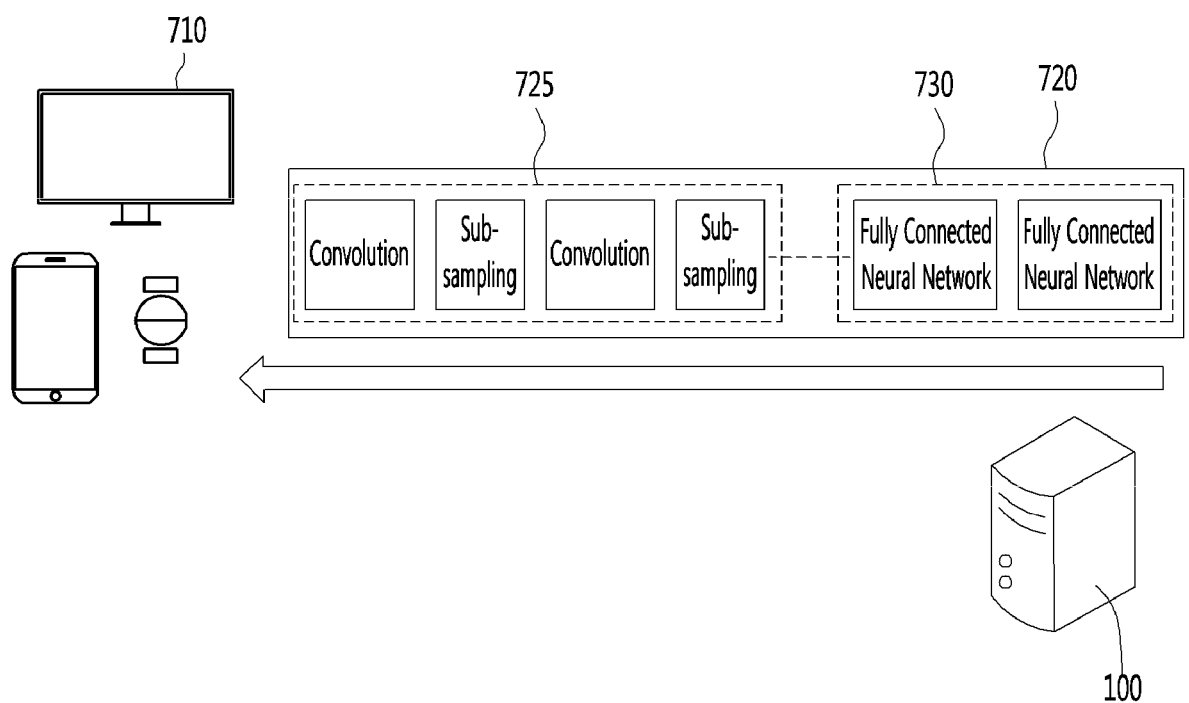
FIG. 7 is a view for describing distribution of the generated AI model.

FIG. 7 is a view for describing distribution of the generated AI model.

The CNN that exhibits an accuracy of a certain level or more through repetitive training using the general-purpose training data and the general-purpose labeling data may be referred to as an AI model 720.

Meanwhile, the parameter of the feature extraction layer 725 in a state in which the training is completed may be referred to as a first parameter. Also, the parameter of the classification layer 730 in a state in which the training is completed may be referred to as a $(2\text{-}1)^{th}$ parameter.

That is, the generated AI model 720 may includes a "feature extraction layer 725 for extracting a feature vector with a first parameter" and a "classification layer 730 for classifying input data using a feature vector with a $(2\text{-}1)^{th}$ parameter."

The general-purpose training data has been described as training data for generating the AI model that is universally applied to various categories of input data.

The AI model 720 trained using the general-purpose training data may be distributed and used in a plurality of electronic devices 710.

In detail, the processor may transmit the AI model 720 to the electronic device 710. The electronic device 710 may download the AI model 720 and use the downloaded AI model 720 for recognition.

Meanwhile, the use environment of the user of the electronic device may be very diverse.

For example, the user mainly uses input data of a specific category, but the data of the specific category may not be included in the general-purpose training data, or only a small amount of the data may be included. For example, the AI model is provided for classifying types of rounded fruits. The AI model is trained using general-purpose training data including apple images, orange images, and tomato images. However, the user may use the AI model to classify watermelons. In this case, the performance of the AI model is reduced.

As another example, the user mainly uses input data of a specific category, but the data of the specific category has been used as training data on a level equivalent to those of other categories. For example, the AI model is provided for categorizing blacks, whites, and Asians. The AI model is trained using the general-purpose training data including black, white, and Asian images. However, the user may use the AI model to classify Asians except for blacks and whites. In this case, the AI model that universally classifies blacks, whites, and Asians may not perform better than AI models specialized for Asians.

However, if the entire feature extraction layer and classification layer are retrained, there is a problem in that the same level of cost as the first training occurs again.

However, the present disclosure may provide an AI model optimized for an individual by updating and distributing only a classification layer.

FIG. 8 is a view for describing a method for updating a classification layer.

The processor may train the generated AI model (or the AI model distributed to the electronic device) 720.

In detail, the processor may train the AI model 720 by providing classification training data and classification labeling data to the AI model 720.

The classification training data may be training data for improving the performance of the AI model with respect to input data of a specific category. Also, the classification training data may be training data belonging to the specific category.

For example, the classification training data may be training data for improving the performance of a face recognition model with respect to input data of a specific category (Asians). Therefore, the classification training data may include a plurality of facial images of Asians. However, the present disclosure is not limited thereto, and facial images of whites and blacks may also be used as the classification training data together with the facial images of the Asians.

As another example, the classification training data may be training data for improving the performance of the fruit classification model with respect to input data of a specific category (watermelon). Therefore, the classification training data may include a plurality of watermelon images. However, the present disclosure is not limited thereto, and images of other fruits may also be used as the classification training data together with the watermelon images.

Meanwhile, the classification labeling data may be data provided to the AI model as the correct answer value of the classification training data in supervised learning.

For example, if the classification training data (watermelon images) corresponding to the specific category is provided to the AI model, the classification labeling data may be watermelon.

Meanwhile, the processor may update the classification layer by training the AI model in such a manner that the classification training data and the classification labeling data are provided to the AI model including the feature extraction layer and the classification layer.

In detail, the AI model 720 may receive the classification training data and extract the feature vector of the classification training data according to the parameter set to the feature extraction layer 725. The parameter set to the feature extraction layer 725 may be the first parameter described above.

Also, the AI model 720 may output an estimated value according to the parameter set to the classification layer. The estimated value may refer to a result obtained when the classification layer classifies the feature vector into any one of a plurality of classes. The parameter set to the classification layer may be the $(2-1)^{th}$ parameter described above. That is, the classification layer generated by training the CNN using the general-purpose training data may be used again.

The processor may obtain a classification layer 830 having a $(2-2)^{th}$ parameter different from the $(2-1)^{th}$ parameter by training the AI model in such a manner that the classification training data and the classification labeling data are provided to the AI model 720.

In detail, in the process of training the AI model 720, the processor may adjust the parameter (at least one of the weight or the bias) of the classification layer so that the error between the classification labeling data and the estimated value of the AI model 720 is reduced.

In more detail, the processor may change the parameter of the classification layer so as to minimize the cost (error between the estimated value of the neural network and the general-purpose labeling data) based on the cost function. As the cost function, a Triplet Loss cost function may be used, but the present disclosure is not limited thereto.

It should be noted that, unlike the process of training the CNN, the parameter of the feature extraction layer 725 is not changed.

In detail, in the process of training the CNN, not only the parameter of the classification layer but also the parameter of the feature extraction layer are updated based on the backpropagation algorithm.

However, in the process of training the AI model, the processor may adjust the parameter of the classification layer so that the error between the estimated value of the AI model 720 and the classification labeling data is reduced, and the parameter of the feature extraction layer 725 may remain as before.

Meanwhile, if the AI model 720 shows an accuracy of a certain level or more through repetitive training using the classification training data and the classification labeling data, the processor may complete training of the AI model 720.

Meanwhile, since the cost (or error) is not propagated back to the feature extraction layer, the parameter of the feature extraction layer in a state in which the training is completed may remain as before the training of the AI model even after the AI model 720 is trained.

However, due to the training of the AI model, the parameter of the classification layer is changed from the $(2-1)^{th}$ parameter to the $(2-2)^{th}$ parameter different from the $(2-1)^{th}$ parameter.

That is, the trained AI model may include a feature extraction layer 725 having the same parameters (first parameter) as before training and a classification layer 830 having a parameter ($(2-2)^{th}$ parameter) different from before training.

Meanwhile, as described above, the parameter set to the classification layer when starting the training of the AI model may be the $(2-1)^{th}$ parameter. However, the present disclosure is not limited thereto, and the parameter set to the classification layer when starting the training of the AI model may be an initial parameter.

In detail, the processor may train the AI model by replacing the classification layer having the $(2-1)^{th}$ parameter with the classification layer having the initial parameter and providing the classification training data and the classification labeling data to the AI model.

In this case, the processor may adjust the parameter (at least one of the weight or the bias) of the classification layer so that an error between the estimated value of the AI model 720 and the classification labeling data is reduced.

If the AI model 720 shows an accuracy of a certain level or more through repetitive training using the classification training data and the classification labeling data, the processor may complete training of the AI model 720.

Due to the training of the AI model, the parameter of the classification layer is changed from the initial parameter to the $(2-2)^{th}$ parameter.

Also, the general-purpose training data has been used in the process of training the CNN, and the classification training data has been used in the process of training the AI model. That is, since the data used for training are different from each other, the $(2-2)^{th}$ parameter set to the classification layer by training the AI model may be different from the $(2-1)^{th}$ parameter set to the classification layer while training the CNN.

Figure 9:
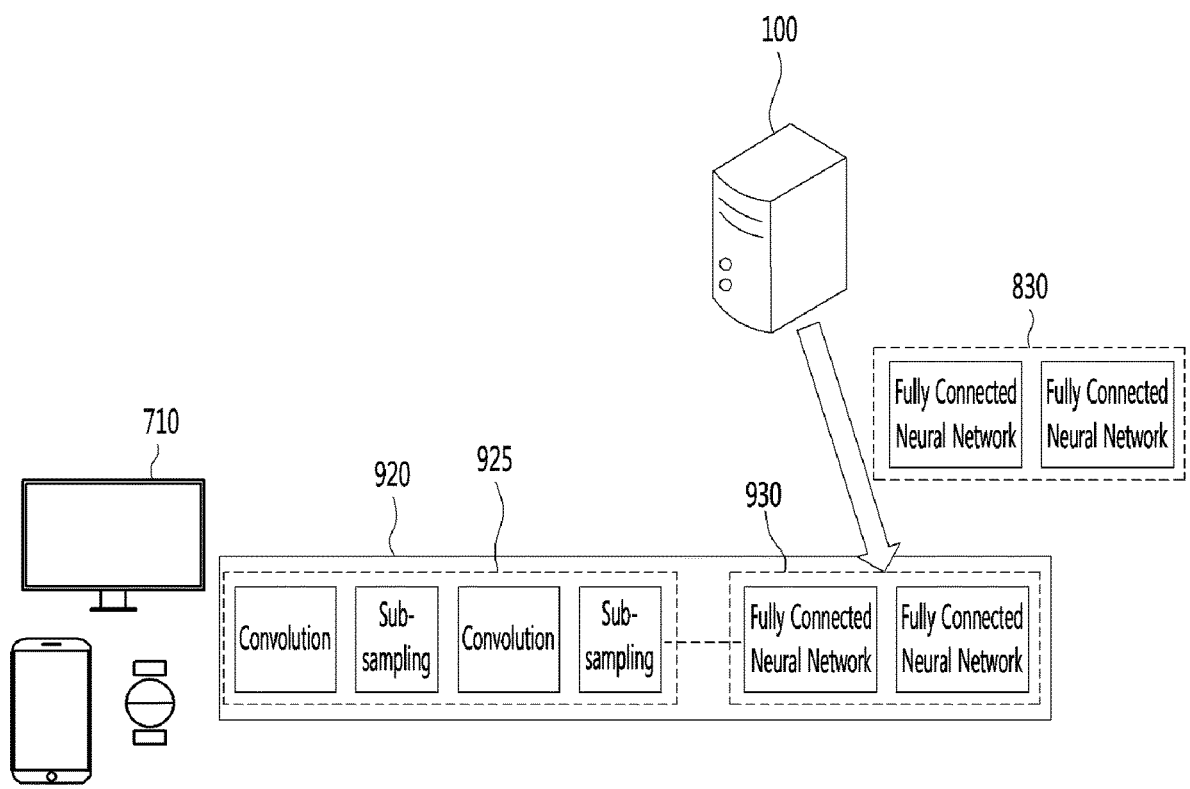
FIG. 9 is a view for describing distribution of the classification layer.

FIG. 9 is a view for describing distribution of the classification layer.

The processor may transmit the updated classification layer 830 to the electronic device 710.

In detail, the processor may separate the classification layer 830 having the $(2-2)^{th}$ parameter from the feature extraction layer and transmit the classification layer 830 to the electronic device 710.

In this case, the electronic device 710 may receive the classification layer 830 having the $(2-2)^{th}$ parameter.

Meanwhile, the electronic device 710 is mounted with an AI model 920 previously downloaded from the AI server 100.

The AI model 920 mounted on the electronic device 710 may include a feature extraction layer 925 having a first parameter and a classification layer 930 having a $(2-1)^{th}$ parameter. Meanwhile, the classification layer having the $(2-1)^{th}$ parameter is merely an example, and the classification layer 930 may have any other parameters.

Meanwhile, the electronic device 710 may receive the classification layer 830 and replace the classification layer 930 previously included in the AI model 920 with the received classification layer 830.

The electronic device 710 may connect the feature extraction layer 925 previously included in the AI model 920 to the received classification layer 830.

There is a need to update the AI model. Examples thereof include a case in which a new category needs to be classified (a case in which an existing AI model classifying apples, oranges, and tomatoes is updated to additionally classify watermelons) and a case in which performance for categories used frequently by a user is improved (a case in which an existing AI model classifying blacks, whites, and Asians is updated to better classify Asians).

According to the present disclosure, since only the classification layer is updated and distributed, the amount of training data, training time, and amount of distributed data can be reduced as compared to the method of updating and distributing both the feature extraction layer and the classification layer.

Figure 10:
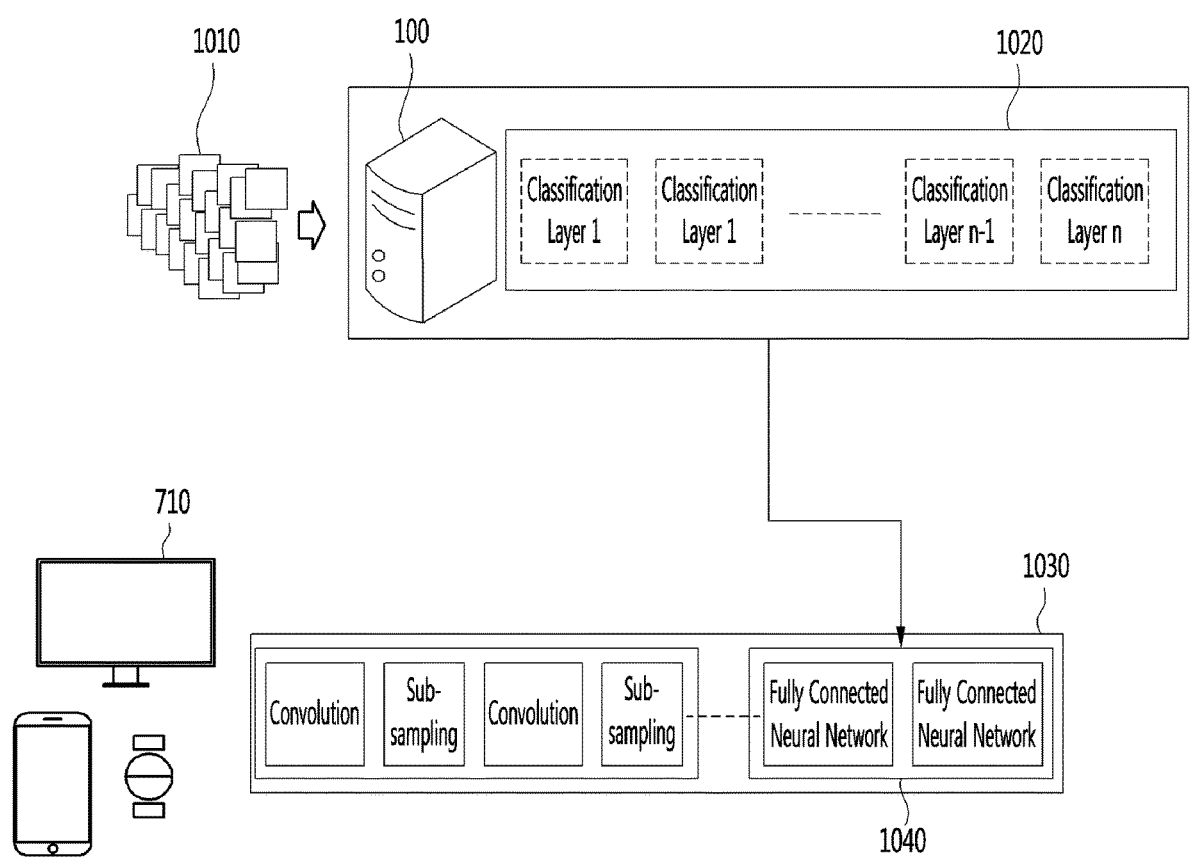
FIG. 10 is a view for describing a method of generating a plurality of classification layers and providing the plurality of classification layers to an electronic device.

FIG. 10 is a view for describing a method of generating a plurality of classification layers and providing the plurality of classification layers to an electronic device.

The processor may generate a plurality of classification layers having different parameters and store the generated classification layers in the memory 1020.

In detail, the processor may obtain a classification layer corresponding to a first category by updating the classification layer by providing classification training data and classification labeling data corresponding to the first category to the AI model, and store the classification layer corresponding to the first category in the memory. In this case, the classification layer may have a (2-3)th parameter.

The classification training data corresponding to the first category may be training data for improving the performance of the AI model with respect to the input data of the first category.

For example, the processor may update the classification layer by providing the classification training data corresponding to Koreans to the AI model so as to improve the performance of the AI model for the Korean image. Accordingly, the processor may obtain a classification layer corresponding to Korean and store the classification layer corresponding to Korean in the memory. In this case, the classification layer may have a (2-3)th parameter.

Also, the processor may obtain a classification layer corresponding to a second category by updating the classification layer by providing classification training data and classification labeling data corresponding to the second category to the AI model, and store the classification layer corresponding to the second category in the memory. In this case, the classification layer may have a (2-4)th parameter different from the (2-3)th parameter.

For example, the processor may update the classification layer by providing the classification training data corresponding to Japanese to the AI model so as to improve the performance of the AI model for the Japanese image. Accordingly, the processor may obtain a classification layer corresponding to Japanese and store the classification layer corresponding to Japanese in the memory. In this case, the classification layer may have a (2-4)th parameter.

Various methods of distributing the classification layer will be described with reference to FIGS. 11 and 12.

Figure 11:
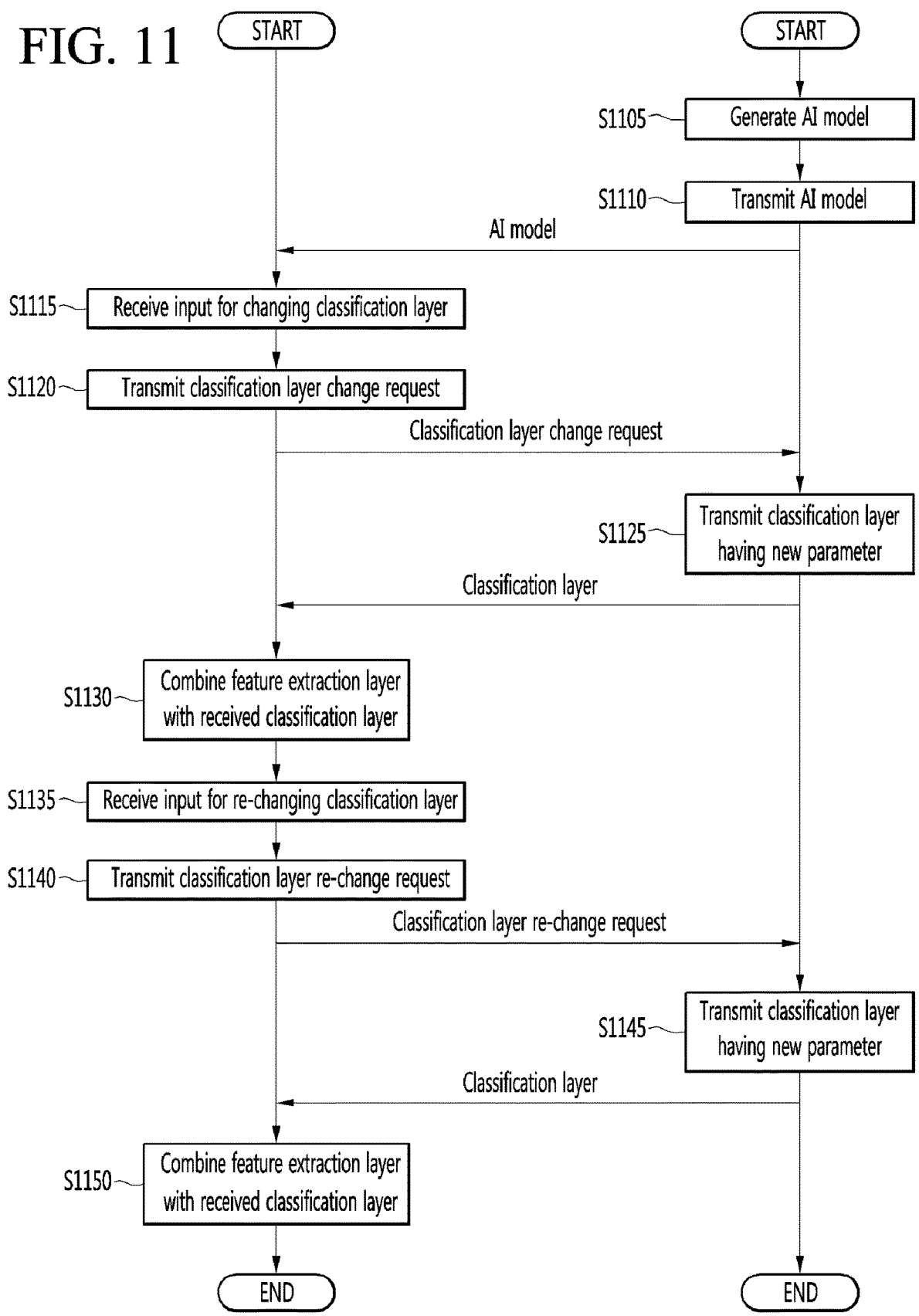
FIG. 11 is a view for describing a method of replacing a classification layer.

FIG. 11 is a view for describing a method of replacing a classification layer.

As the AI server 100 generates and transmits the AI model (S1105 and S1110), the AI model is mounted on the electronic device.

Meanwhile, the electronic device may receive an input for changing the classification layer (S1115). For example, the user who is not satisfied with the performance of the AI model can operate his or her electronic device so as to change the classification layer. In this case, the electronic device may receive, from the user, an input for changing the classification layer.

Also, the electronic device may transmit a classification layer change request to the AI server 100 (S1120).

If the classification layer change request is received from the electronic device, the AI server 100 may transmit a classification layer having a new parameter to the electronic device (S1125).

In detail, the AI server 100 may transmit, to the electronic device, one or more classification layers among a plurality of classification layers stored in the memory and having different parameters. The one or more classification layers transmitted at this time may be classification layers that have not been previously transmitted to the electronic device.

Meanwhile, the electronic device may receive the classification layer and replace the classification layer included in the existing AI model with the received classification layer. In detail, the electronic device may receive the classification layer and connect the received classification layer to the feature extraction layer included in the existing AI model (S1130).

Meanwhile, if a plurality of classification layers are received, the electronic device may replace the classification layer included in the existing AI model with a first classification layer among the plurality of received classification layers.

Also, based on a user input, the electronic device may replace the first classification layer included in the AI model with a second classification layer among the plurality of received classification layers.

The electronic device may receive an input for re-changing the classification layer (S1135). For example, if the user is not satisfied with the performance of the classification layer received from the AI server, the user may operate his or her electronic device so as to change the classification layer again. In this case, the electronic device may receive, from the user, an input for re-changing the classification layer.

The electronic device may transmit a classification layer re-change request to the AI server 100 (S1140).

If the classification layer re-change request is received from the electronic device, the AI server 100 may transmit a classification layer having a new parameter to the electronic device (S1145).

In detail, the AI server 100 may transmit, to the electronic device, one or more classification layers among a plurality of classification layers stored in the memory and having different parameters. Also, the AI server 100 may transmit, to the electronic device, a classification layer that has not been transmitted to the electronic device.

Meanwhile, the electronic device may receive the classification layer and replace the classification layer included in the existing AI model with the received classification layer. In detail, the electronic device may receive the classification layer and connect the received classification layer to the feature extraction layer included in the existing AI model (S1150). The electronic device may delete the classification layer included in the existing AI model from the memory.

According to the present disclosure, a classification layer having various parameters is provided to a user terminal according to the classification layer change request from the user terminal. Therefore, if the user is not satisfied with the current performance, it is possible to provide the user with a further improved AI model.

Figure 12:
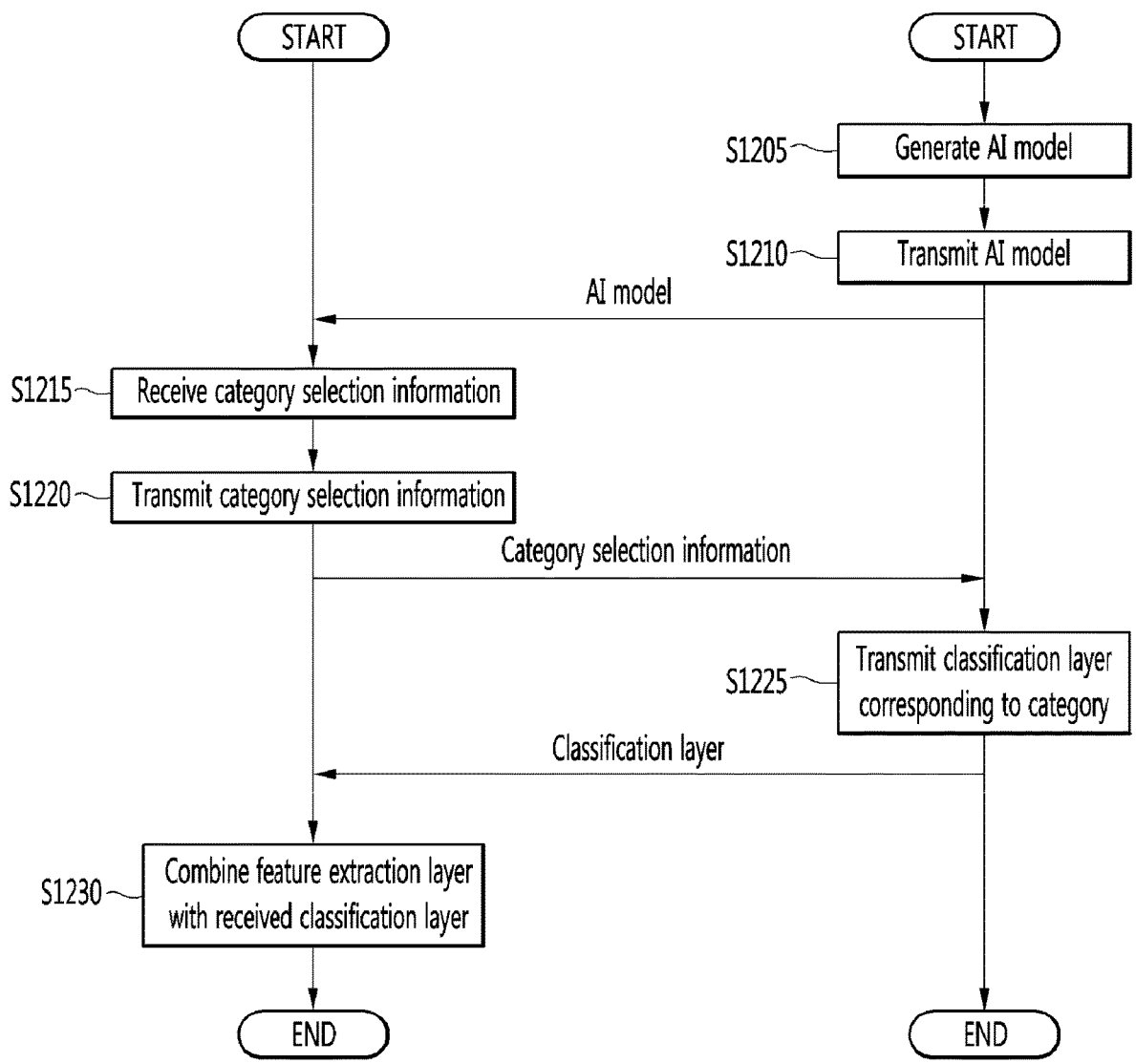
FIG. 12 is a view for describing a method of providing a classification layer of a category desired by a user.

FIG. 12 is a view for describing a method of providing a classification layer of a category desired by a user.

As the AI server 100 generates and transmits the AI model (S1205 and S1210), the AI model is mounted on the electronic device.

Meanwhile, the electronic device may receive an input for selecting a category (S1215). For example, a user who wants an AI model to have high performance for a specific category may operate his or her electronic device so as to designate the category.

Meanwhile, based on the input for selecting the category, the electronic device may transmit category selection information to the AI server 100 (S1220). The category selection information may include information about what category is selected by the user.

If the category selection information is received from the electronic device, the AI server 100 may transmit, to the electronic device, a classification layer corresponding to the received category selection information (S1225).

In detail, if the received category selection information corresponds to a first category, the AI server 100 may transmit, to the electronic device, a classification layer corresponding to the first category.

For example, if the received category selection information indicates Korean, the AI server 100 may transmit, to the electronic device, a classification layer corresponding to the Korean. As another example, if the received category selection information indicates Japanese, the AI server 100 may transmit, to the electronic device, a classification layer corresponding to the Japanese.

Meanwhile, the electronic device may receive the classification layer corresponding to the first category and replace the classification layer included in the existing AI model with the classification layer corresponding to the first category (S1230).

Meanwhile, the electronic device may delete the classification layer included in the existing AI model from the memory.

In detail, the electronic device may obtain a result of recognizing input data by using the AI model including the feature extraction layer and the classification layer corresponding to the first category. In this case, one or more instructions constituting the feature extraction layer and the classification layer may be stored in the memory.

Meanwhile, the electronic device may receive a classification layer corresponding to a second category and replace the classification layer corresponding to the first category with the classification layer corresponding to the second category. In this case, the electronic device may delete the classification layer corresponding to the first category from the memory and store the classification layer corresponding to the second category in the memory.

Figure 13:
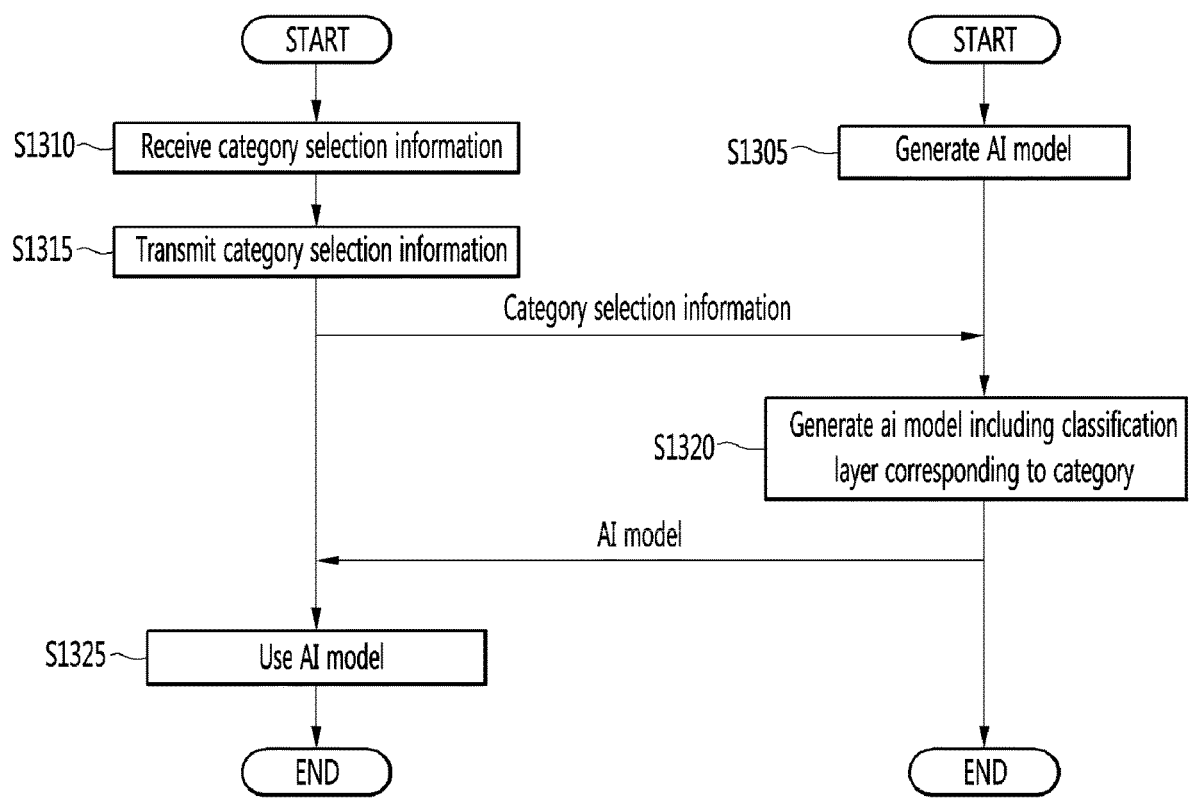
FIG. 13 is a view for describing another method of providing a classification layer of a category desired by a user.

FIG. 13 is a view for describing another method of providing a classification layer of a category desired by a user.

The AI server 100 is in a state of generating the AI model (S1305). However, the generated AI model has not yet been distributed to the electronic device.

Meanwhile, the electronic device may receive an input for selecting a category (S1310). For example, a user who wants an AI model to have high performance for a specific category may operate his or her electronic device so as to designate the category.

Meanwhile, based on the input for selecting the category, the electronic device may transmit category selection information to the AI server 100 (S1315). The category selection information may include information about the category selected by the user.

If the category selection information is received from the electronic device, the AI server 100 may transmit, to the electronic device, the AI model including the classification layer corresponding to the received category selection information (S1320).

In detail, the AI server 100 may combines the classification layer corresponding to category selection information with a feature extraction layer included in the AI model generated in S1305, and transmit, to the electronic device, the AI model including the feature extraction layer and the classification layer.

Meanwhile, the electronic device may receive the AI model (S1325) and perform recognition using the received AI model.

According to the present disclosure, the classification layer that satisfies the user's needs may be provided by providing the user terminal with the classification layer exhibiting high performance in the category selected by the user.

Meanwhile, the process of updating the classification layer using the classification training data has been described as being performed by the AI server, but the present disclosure is not limited thereto. In detail, if the electronic device possesses classification training data and classification labeling data, the electronic device may update the classification layer by training the AI model in such a manner that the classification training model and the classification labeling data are provided to the AI model.

Next, an operating method of the AI server will be described.

The operating method of the AI server may include: updating a classification layer by training an AI model in such a manner that classification training data and classification labeling data are provided to the AI model including a feature extraction layer for extracting a feature vector and a classification layer for classifying input data using the feature vector; and transmitting the updated classification layer to the electronic device.

In this case, the operating method may further include generating the AI model including the feature extraction layer having a first parameter and the classification layer having a $(2\text{-}1)^{th}$ parameter by training the neural network using general-purpose training data and general-purpose labeling data.

In this case, the updating of the classification layer may include obtaining the classification layer having a $(2\text{-}2)^{th}$ parameter different from the $(2\text{-}1)^{th}$ parameter by training the AI model in such a manner that the classification training data and the classification labeling data are provided to the AI model.

In this case, the obtaining of the classification layer having the $(2\text{-}2)^{th}$ parameter may include replacing the classification layer with the $(2\text{-}1)^{th}$ parameter with a classification layer with an initial parameter, and obtaining the classification layer having the $(2\text{-}2)^{th}$ parameter by training the AI model in such a manner that the classification training data and the classification labeling data are provided to the AI model.

Meanwhile, the generating of the AI model may include adjusting the parameter of the feature extraction layer and the parameter of the classification layer, so that an error between the estimated value of the neural network and the general-purpose labeling data is reduced, in the process of training the neural network, and the obtaining of the classification layer having the $(2\text{-}2)^{th}$ parameter may include adjusting the parameter of the classification layer, so that an error between the estimated value of the AI model and the classification labeling data, in the process of training the AI model.

Meanwhile, even after the AI model is trained, the first parameter of the feature extraction layer may remain as before the training of the AI model.

Meanwhile, the trained AI model may include the feature extraction layer having the first parameter and the classification layer having the $(2\text{-}2)^{th}$ parameter, and the transmitting of the updated classification layer to the electronic device may include separating the classification layer having the $(2\text{-}2)^{th}$ parameter from the feature extraction layer and transmitting the separated classification layer to the electronic device.

Meanwhile, the transmitting of the updated classification layer to the electronic device may include transmitting, to the electronic device, one or more classification layers among the plurality of classification layers having different parameters if the classification layer change request is received from the electronic device.

Meanwhile, the updating of the classification layer may include: obtaining the classification layer corresponding to the first category by updating the classification layer by providing the classification training data and the classification labeling data corresponding to the first category to the AI model, and storing the classification layer corresponding to the first category in the memory; and obtaining the classification layer corresponding to the second category by updating the classification layer by providing the classification training data and the classification labeling data corresponding to the second category to the AI model, and storing the classification layer corresponding to the second category in the memory.

In this case, the transmitting of the updated classification layer to the electronic device may include receiving category selection information from the electronic device, and transmitting, to the electronic device, the classification layer corresponding to the first category if the received category selection information corresponds to the first category.

There is a need to update the AI model. Examples thereof include a case in which a new category needs to be classified (a case in which an existing AI model classifying apples, oranges, and tomatoes is updated to additionally classify watermelons) and a case in which performance for categories used frequently by a user is improved (a case in which an existing AI model classifying blacks, whites, and Asians is updated to better classify Asians).

According to the present disclosure, since only the classification layer is updated and distributed, the amount of training data, training time, and amount of distributed data can be reduced as compared to the method of updating and distributing both the feature extraction layer and the classification layer.

The above-described present disclosure may be implemented as a computer-readable code on a computer-readable medium in which a program is stored. The computer readable recording medium includes all types of recording devices in which data readable by a computer system is stored. Examples of the computer-readable recording medium include hard disk drives (HDD), solid state disks (SSD), silicon disk drives (SDD), read only memories (ROMs), random access memories (RAMs), compact disc read only memories (CD-ROMs), magnetic tapes, floppy discs, and optical data storage devices. Also, the computer may include a processor 180 of the terminal.

Therefore, the detailed description is intended to be illustrative, but not limiting in all aspects. It is intended that the scope of the present disclosure should be determined by the rational interpretation of the claims as set forth, and the modifications and variations of the present disclosure come within the scope of the appended claims and their equivalents.

What is claimed is:

1. An artificial intelligence server comprising:
   a communication interface configured to communicate with an electronic device; and
   at least one processor configured to:
   generate an artificial intelligence model including a feature extraction layer having a first parameter for extracting a feature vector and a classification layer having a (2-1)th parameter for classifying input data using the feature vector by training a neural network using general-purpose training data and general-purpose labeling data;
   obtain a classification layer having a (2-2)th parameter different from the (2-1)th parameter by training the artificial intelligence model in such a manner that classification training data and classification labeling data are provided to the artificial intelligence model;
   update the classification layer having the $(2\text{-}1)^{th}$ parameter with the classification layer having the $(2\text{-}2)^{th}$ parameter, wherein, even after the artificial intelligence model is trained, the first parameter of the feature extraction layer remains as before the training of the artificial intelligence model; and
   transmit the updated classification layer having the $(2\text{-}2)^{th}$ parameter to the electronic device.

2. The artificial intelligence server according to claim 1, wherein the at least one processor is configured to:
   replace the classification layer having the $(2\text{-}1)^{th}$ parameter with a classification layer having an initial parameter; and
   obtain the classification layer having the $(2\text{-}2)^{th}$ parameter by training the artificial intelligence model in such a manner that the classification training data and the classification labeling data are provided to the artificial intelligence model.

3. The artificial intelligence server according to claim 1, wherein the at least one processor is configured to:
   adjust a parameter of the feature extraction layer and a parameter of the classification layer, so that an error between an estimated value of the neural network and the general-purpose labeling data is reduced, in the process of training the neural network; and
   adjust the parameter of the classification layer, so that an error between an estimated value of the artificial intelligence model and the classification labeling data is reduced, in the process of training the artificial intelligence model.

4. The artificial intelligence server according to claim 1, wherein the trained artificial intelligence model comprises the feature extraction layer having the first parameter and the classification layer having the $(2\text{-}2)^{th}$ parameter, and
   wherein the at least one processor is configured to:
   separate the classification layer having the $(2\text{-}2)^{th}$ parameter from the feature extraction layer; and
   transmit the separated classification layer to the electronic device.

5. The artificial intelligence server according to claim 1, further comprising at least one memory configured to store a plurality of classification layers having different parameters,
   wherein the at least one processor is configured to transmit, to the electronic device, one or more classification layers among the plurality of classification layers if a classification layer change request is received from the electronic device.

6. The artificial intelligence server according to claim 1, further comprising at least one memory configured to store data,
wherein the at least one processor is configured to:
obtain a classification layer corresponding to a first category by updating the classification layer by providing classification training data and classification labeling data corresponding to the first category to the artificial intelligence model, and store the classification layer corresponding to the first category in the at least one memory; and
obtain a classification layer corresponding to a second category by updating the classification layer by providing classification training data and classification labeling data corresponding to the second category to the artificial intelligence model, and store the classification layer corresponding to the second category in the at least one memory.

7. The artificial intelligence server according to claim 6, wherein the at least one processor is configured to:
receive category selection information from the electronic device; and
transmit, to the electronic device, the classification layer corresponding to the first category if the received category selection information corresponds to the first category.

8. The artificial intelligence server according to claim 1, wherein at least a part of the classification training data is training data belonging to a specific category, which is included in the general-purpose training data.

9. An operating method of an artificial intelligence server, the operating method comprising:
generating an artificial intelligence model including a feature extraction layer having a first parameter and the classification layer having a (2-1)th parameter by training a neural network using general-purpose training data and general-purpose labeling data;
obtaining a classification layer having a (2-2)th parameter different from the (2-1)th parameter by training the artificial intelligence model in such a manner that classification training data and classification labeling data are provided to the artificial intelligence model;
updating the classification layer having the (2-1)th parameter with the classification layer having the (2-2)th parameter, wherein, even after the artificial intelligence model is trained, the first parameter of the feature extraction layer remains as before the training of the artificial intelligence model; and
transmitting the updated classification layer to an electronic device.

10. The operating method according to claim 9, wherein the obtaining of the classification layer having the $(2\text{-}2)^{th}$ parameter comprises:
replacing the classification layer having the $(2\text{-}1)^{th}$ parameter with a classification layer having an initial parameter; and
obtaining the classification layer having the $(2\text{-}2)^{th}$ parameter by training the artificial intelligence model in such a manner that the classification training data and the classification labeling data are provided to the artificial intelligence model.

11. The operating method according to claim 9, wherein the generating of the artificial intelligence model comprises adjusting a parameter of the feature extraction layer and a parameter of the classification layer, so that an error between an estimated value of the neural network and the general-purpose labeling data is reduced, in the process of training the neural network, and
wherein the updating of the classification layer comprises adjusting the parameter of the classification layer, so that an error between an estimated value of the artificial intelligence model and the classification labeling data is reduced, in the process of training the artificial intelligence model.

12. The operating method according to claim 9, wherein the trained artificial intelligence model comprises the feature extraction layer having the first parameter and the classification layer having the $(2\text{-}2)^{th}$ parameter, and
wherein the transmitting of the updated classification layer to the electronic device comprises:
separating the classification layer having the $(2\text{-}2)^{th}$ parameter from the feature extraction layer; and
transmitting the separated classification layer to the electronic device.

13. The operating method according to claim 9, wherein the transmitting of the updated classification layer to the electronic device comprises transmitting, to the electronic device, one or more classification layers among a plurality of classification layers having different parameters if a classification layer change request is received from the electronic device.

14. The operating method according to claim 9, wherein the updating of the classification layer comprises:
obtaining a classification layer corresponding to a first category by updating the classification layer by providing classification training data and classification labeling data corresponding to the first category to the artificial intelligence model, and storing the classification layer corresponding to the first category in the at least one memory; and
obtaining a classification layer corresponding to a second category by updating the classification layer by providing classification training data and classification labeling data corresponding to the second category to the artificial intelligence model, and storing the classification layer corresponding to the second category in the at least one memory.

15. The operating method according to claim 14, wherein the transmitting of the updated classification layer to the electronic device comprises:
receiving category selection information from the electronic device; and
transmitting, to the electronic device, the classification layer corresponding to the first category if the received category selection information corresponds to the first category.

* * * * *